United States Patent

Jagush et al.

[11] Patent Number: 5,849,192
[45] Date of Patent: Dec. 15, 1998

[54] PROCEDURE TO RECOVER FROM NITRIFICATION UPSETS

[75] Inventors: Frederic A. Jagush, Friendswood; Walter V. Burnham, III, Lake Jackson, both of Tex.

[73] Assignee: BASF Corporation, Mount Olive, N.J.

[21] Appl. No.: 600,081

[22] Filed: Feb. 12, 1996

[51] Int. Cl.⁶ .................................................... C02F 3/28
[52] U.S. Cl. .......................... 210/610; 210/631; 210/903
[58] Field of Search ................................. 210/605, 610, 210/611, 630, 631, 903

[56] References Cited

U.S. PATENT DOCUMENTS

| | | | |
|---|---|---|---|
| 3,617,540 | 11/1971 | Bishop et al. | 210/630 |
| 4,693,827 | 9/1987 | Modorski | 210/610 |
| 4,705,633 | 11/1987 | Bogusch | 210/610 |
| 4,732,679 | 3/1988 | Karlsson | 210/605 |

*Primary Examiner*—Thomas G. Wyse
*Attorney, Agent, or Firm*—Joanne P. Will

[57] ABSTRACT

A method to recover from nitrification upsets comprising modifying bioreactor pH by addition of an acid source and addition of an inorganic carbon (IC) source.

3 Claims, 5 Drawing Sheets

Freeport Nitrification Bioreactor

Legend
- Qa: Compressed air flow
- Qf: Feed flow rate
- Qr: Sludge recycle flow
- IC: Inorganic carbon
- TC: Total carbon
- TOC: Total inorganic carbon
- MLVSS: Mixed liquor volatile suspended solids Nitrous acid and ammonia inhibition Nitrification reactor pH and ammonia-nitrogen during June and July Effect of a drop in IC on reactor ammonia-nitrogen concentrations Inorganic carbon requirements in the Nitrification reactor

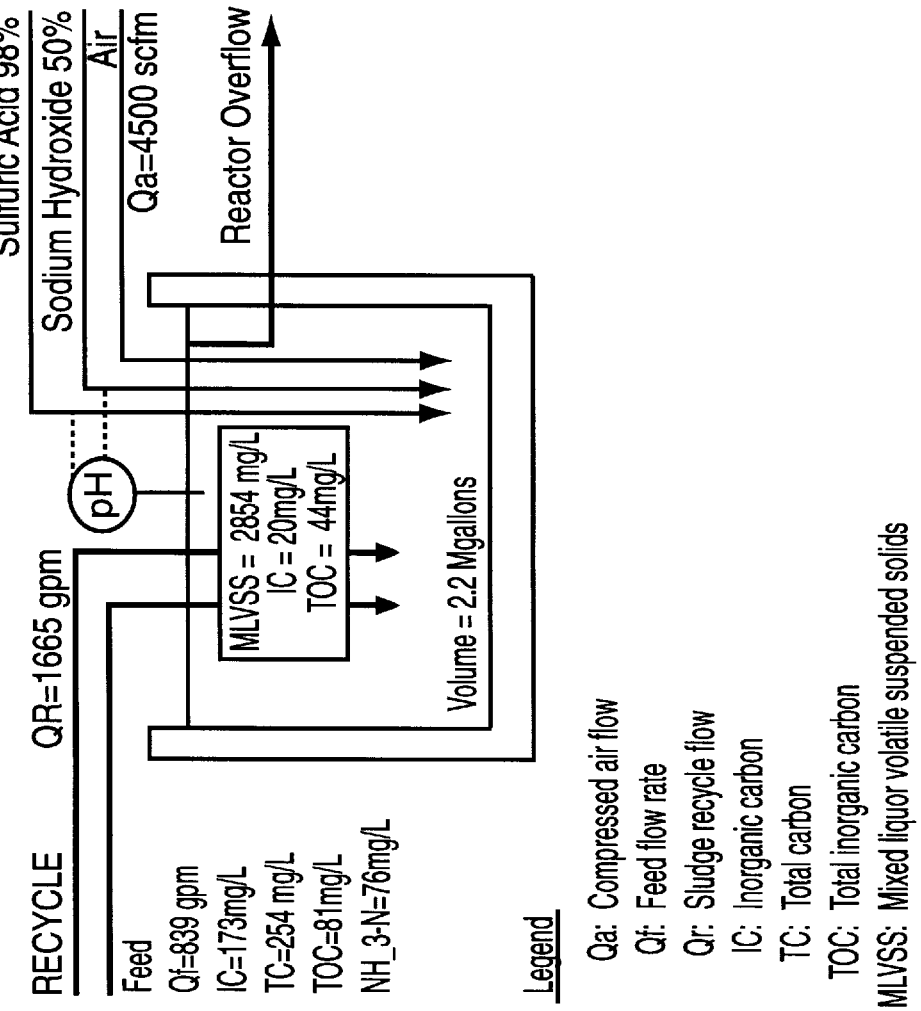

PROCEDURE TO RECOVER FROM NITRIFICATION UPSETS

FIELD OF THE INVENTION

The present invention relates to a procedure for recovering from nitrification upsets in industrial waste water treatment plants.

BACKGROUND

Effective waste water treatment is a major concern of the industrialized world. Waste water often contains phosphorous and nitrogen which stimulates unwanted algae growth, creating unpleasant tastes and odors in the water supply; and operating problems in water treatment plants. Waste water treatment can be accomplished by physical/chemical methods or biological methods. The present invention is concerned with biological nitrification in waste water treatment. The microorganisms involved in nitrification are the nitrifying bacteria, nitrosomonas and nitrobacter. Nitrification is the biological oxidation of ammonia to nitrate with nitrite formation as an intermediate. This biological oxidation reaction produces the energy these bacteria need to assimilate inorganic carbon (IC), which is their sole carbon source for cell synthesis. See, Eckenfelder, *Industrial Water Pollution Control*, 2nd Edit. Nitrifying bacteria are sensitive to pH, temperature, heavy metals, inorganic ions and a number of organic and inorganic compounds. Other factors affecting nitrification performance are the amounts of dissolved oxygen (DO) and inorganic carbon (IC) in the bioreactor.

Thus, the biological nitrification process can be easily upset. An upset in nitrification is characterized by a sudden increase in the concentration of ammonia-nitrogen and inorganic carbon in the bioreactor. Reduced bacterial activity will also be evident by a decrease in reactor nitrite and nitrate concentrations. In many cases the exact cause of the failure is unknown. However, one thing is certain, regaining nitrification is difficult. The loss of activity from the nitrifying bacteria, nitrosomonas and nitrobacter, resulting from toxins, equipment failure, or operator error can disrupt waste water treatment plant performance for weeks or even months. Inhibition of part of the population of nitrosomonas and nitrobacter leaves the same amount of substrate that must be removed by a smaller number of organisms. The remaining organisms must reproduce to replace the organisms lost in the upset. Therefore, system recovery is dependent on the specific growth rate (reproduction rate) of the microorganisms. Nitrifying bacteria have a much slower specific growth rate than heterotrophic bacteria responsible for degradation of organic material. Nitrifying bacteria are autotrophic, i.e. their carbon source is inorganic carbon such as carbon dioxide or bicarbonate. Their slow growth rate decreases the ability of the nitrifiers to recover from system shocks, such as pH or temperature excursions, low dissolved oxygen (DO) levels, or the presence of toxic materials. When an upset of any kind disables the nitrifying bacteria, the ammonia nitrogen in the wastewater often rises to levels which are inhibitory or toxic.

BRIEF DESCRIPTION OF THE DRAWINGS

FIG. 5 is a process flow diagram of the present invention.

Specifically, the most notable inorganic species inhibitory to nitrifying bacteria are nitrous acid and free ammonia. The degree of inhibition of the nitrifying bacteria is dependent on the concentration of these substances. FIG. 1 shows the relationship of pH and concentration of free ammonia and nitrous acid in a nitrification reactor. The solid lines represent the boundaries between the area of complete nitrification and inhibition. As you move away from the complete nitrification triangle, the degree of inhibition of the nitrifying bacteria increases. A graph similar to FIG. 1 can be plotted for every nitrification reactor. These will vary somewhat from one nitrification system to another. The concentrations of ammonia-nitrogen and nitrous acid that determine the position of the boundaries of nitrobacter and nitrosomonas inhibition will be particular to each nitrification system.

Figure 1:
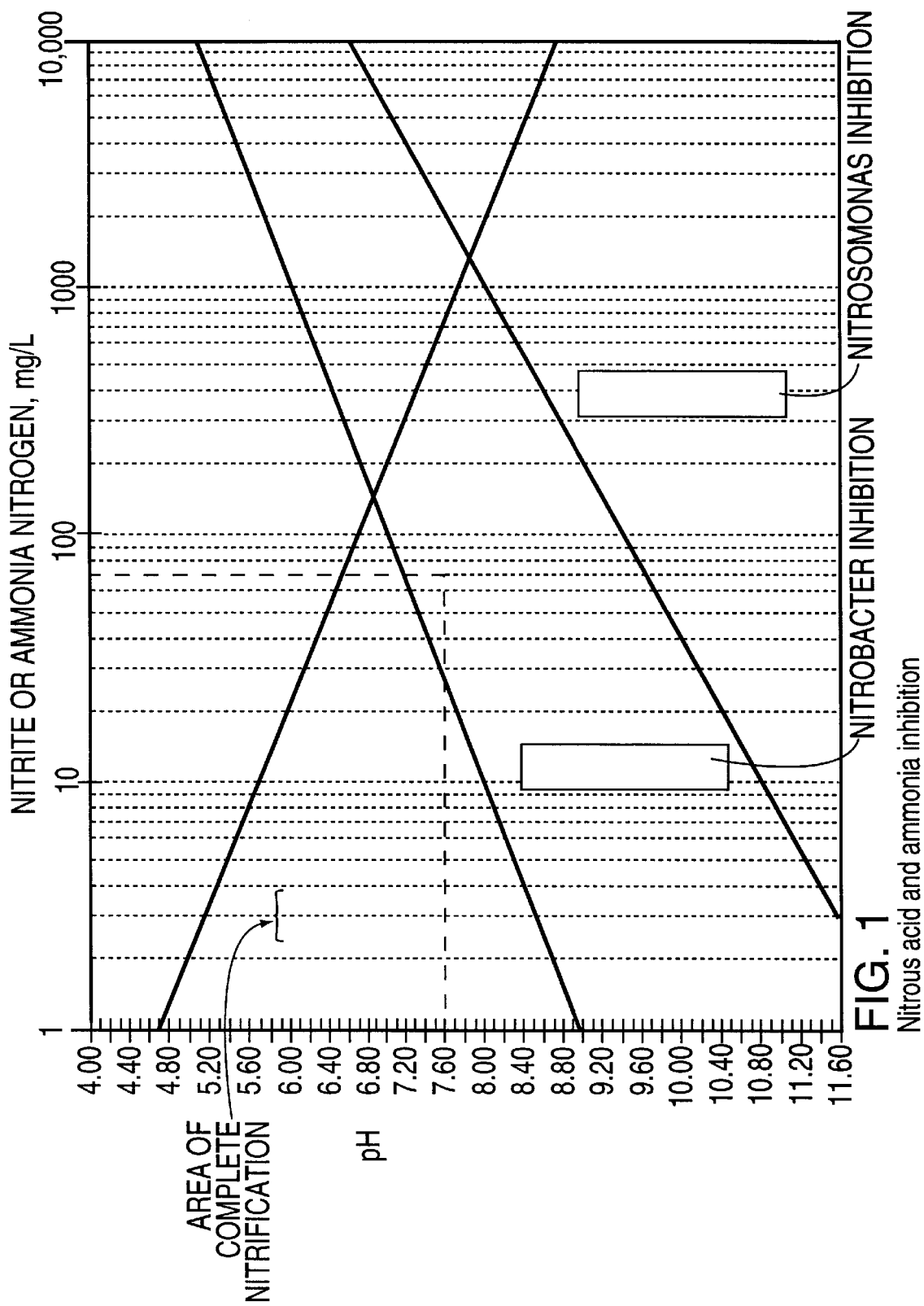
FIGS. 1–4 illustrate the utility of the present invention.

To bring the system out of upset mode, practice has been to reduce all sources of ammonia-nitrogen and let the system purge until nitrification is reestablished. See, *Environmental Pollution Control Alternatives*, US EPA—Technology Transfer, EPA-625/5-76-012. Also, U.S. Pat. No. 4,693,827, assigned to Zimpro, discloses a process for recovery from nitrification upsets wherein a rapidly metabolized soluble organic material, such as phenol, benzene, toluene or methanol or acetic acid, is added to the waste water. Said added organic material is rapidly consumed by carbon-consuming organisms and the excess available ammonia nitrogen is assimilated as a nutrient. U.S. Pat. No. 4,693,827 also discloses that sufficient ammonia nitrogen is removed to reduce the concentration to a non-toxic or less toxic concentration to the nitrifying organisms.

Applicants have surprisingly discovered that recovery from nitrification upsets in waste water treatment systems can be effectively and expeditiously accomplished when an acid source is used to regulate pH and an inorganic carbon source is added to the waste water treatment system.

SUMMARY

A method to recover from nitrification upsets comprising modifying bioreactor pH by addition of an acid source and addition of an inorganic carbon (IC) source.

DETAILED DESCRIPTION

A method to recover from nitrification upsets comprising modifying bioreactor pH by addition of an acid source and addition of an inorganic carbon (IC) source.

The Method of the Present Invention

Once a nitrification upset has occurred, an acid source, including but not limited to $H_2SO_4$ or HCL, is added to lower the pH. The inorganic carbon (IC) source including, but not limited to, sodium bicarbonate, sodium carbonate, and $CO_2$ generated in situ is then added. One skilled in the art knows that the amount, concentration, and rate of addition for the acid and the amount, concentration, and rate of addition of the IC will vary according to the degree of nitrification upset and the operating parameters of each individual water treatment plant.

The following non-limiting Example illustrates how to practice the present invention.

1. When the reactor ammonia nitrogen concentration exceeds 3.0 mg/liter:

adjust pH using $H_2SO_4$ to a control range of 6.8 to 7.3;

add sodium bicarbonate to maintain an inorganic carbon (IC) concentration greater than the theoretical IC requirement.

monitor system once every four (4) hours until recovery is complete.

after the ammonia-nitrogen concentrations are less than 1.0 mg/liter, set the pH controls to a range of 7.3 to 7.8.

This will prevent IC stripping due to lower pH values and eliminate the need for addition of sodium bicarbonate.

The theoretical IC concentration is based on the carbon to nitrogen ratio calculated from the biological nitrification formulas as described in Eckenfelder, Principles of Water Quality Management, pp. 317–320, incorporated by reference herein. Specifically, the biological oxidation of ammonia nitrogen is represented by two equations:

Nitrosomonas oxidizes ammonia to nitrite:

$$55NH_4^+ + 5CO_2 + 76O_2 \rightarrow C_5H_7NO_2 + 109H^+ + 54NO_2^-$$

Nitrobacter oxidizes nitrite to nitrate $$400NO_2^- + 5CO_2 + NH_4^+ + 195O_2 2H_2O \rightarrow C_5H_7NO_2 + 400NO_3^- H^+$$

In the reaction 90 moles of carbonate are destroyed by the hydronium ions produced in the reaction and 10 moles are consumed by bacteria. This represents 0.84 grams of inorganic carbon per gram of nitrogen oxidized.

The present invention can be practiced in a nitrification bioreactor as illustrated in Diagram A. One skilled in the art understands that nitrification bioreactors are constructed and operated according to the needs of the particular wastewater treatment plant.

Monitoring the Effectiveness of the Method of the Present Invention

One skilled in the art understands that once a nitrification upset occurs, and a recovery process has been implemented, careful monitoring of the effectiveness of the recovery process is necessary.

Since IC is very important for nitrification, an effective measurement procedure for IC is needed. Residual alkalinity is used to measure both the buffering capacity of the system and the available inorganic carbon. Alkalinity is expressed in terms of $CaCO_3$ and reflects the amount of bicarbonate and carbonates in a water stream. However, other dissolved substances such as hydroxide ions contribute to alkalinity. This may lead to inaccurate assessments of the amount of IC in the system. A better method to quantify IC is by using a Total Carbon Analyzer. Total Organic Carbon and Total Carbon are measured and the two numbers are subtracted. The analysis is straight forward and accurate and is described in *Standard Methods for Examination of Water and Waste Water*, 18th Edit., incorporated by reference herein.

Figure 2:
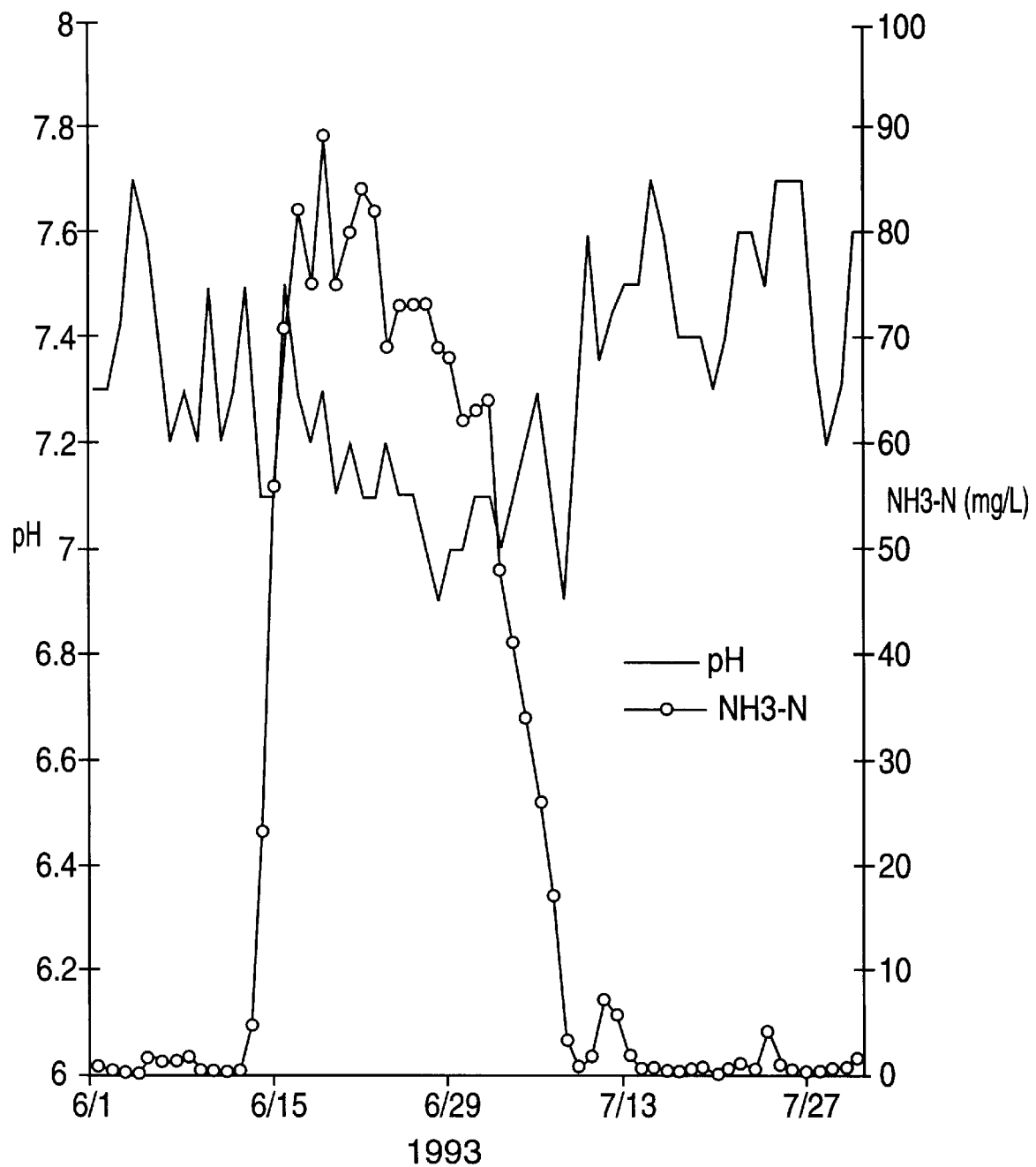
Figure 3:
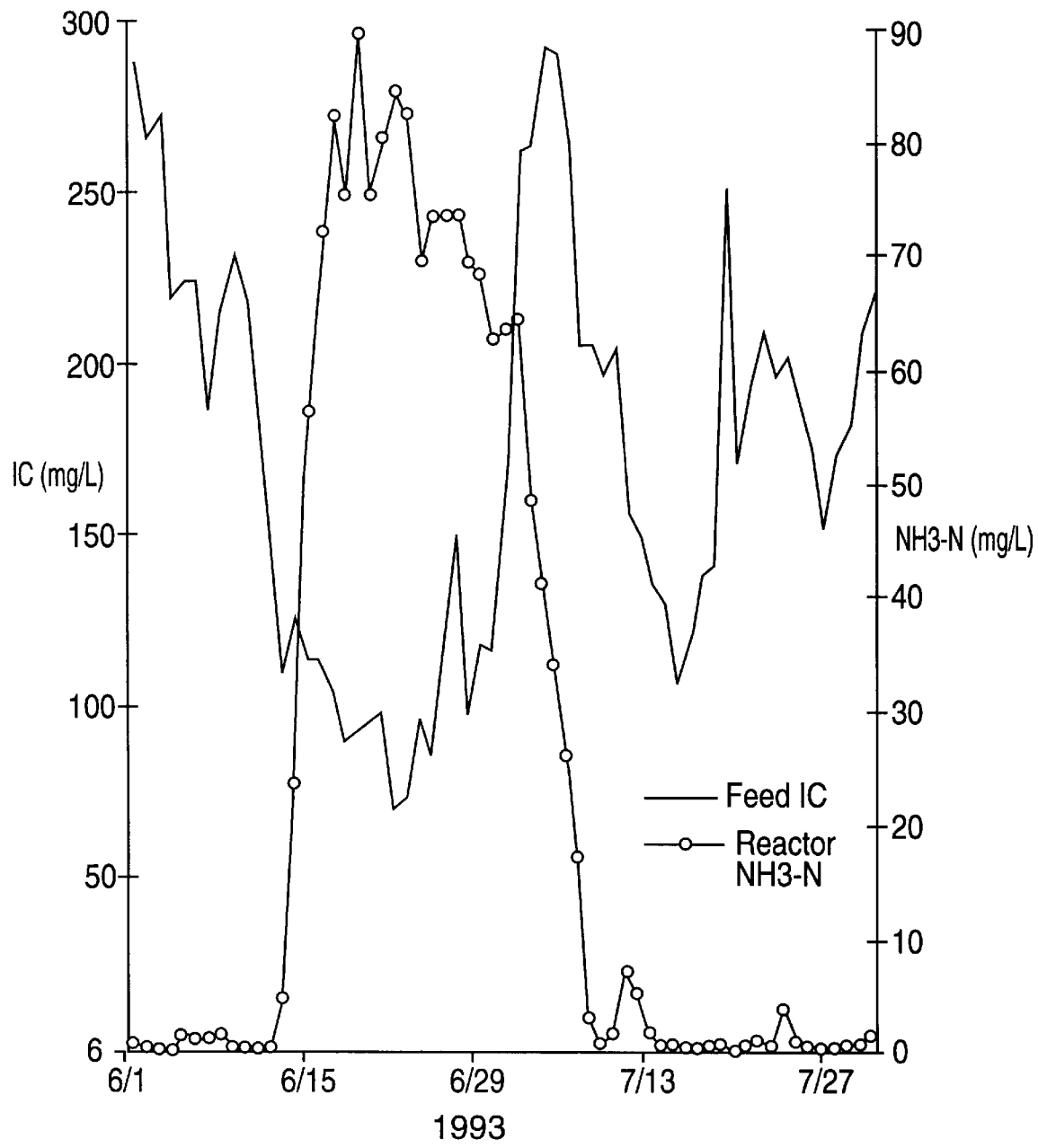
Figure 4:
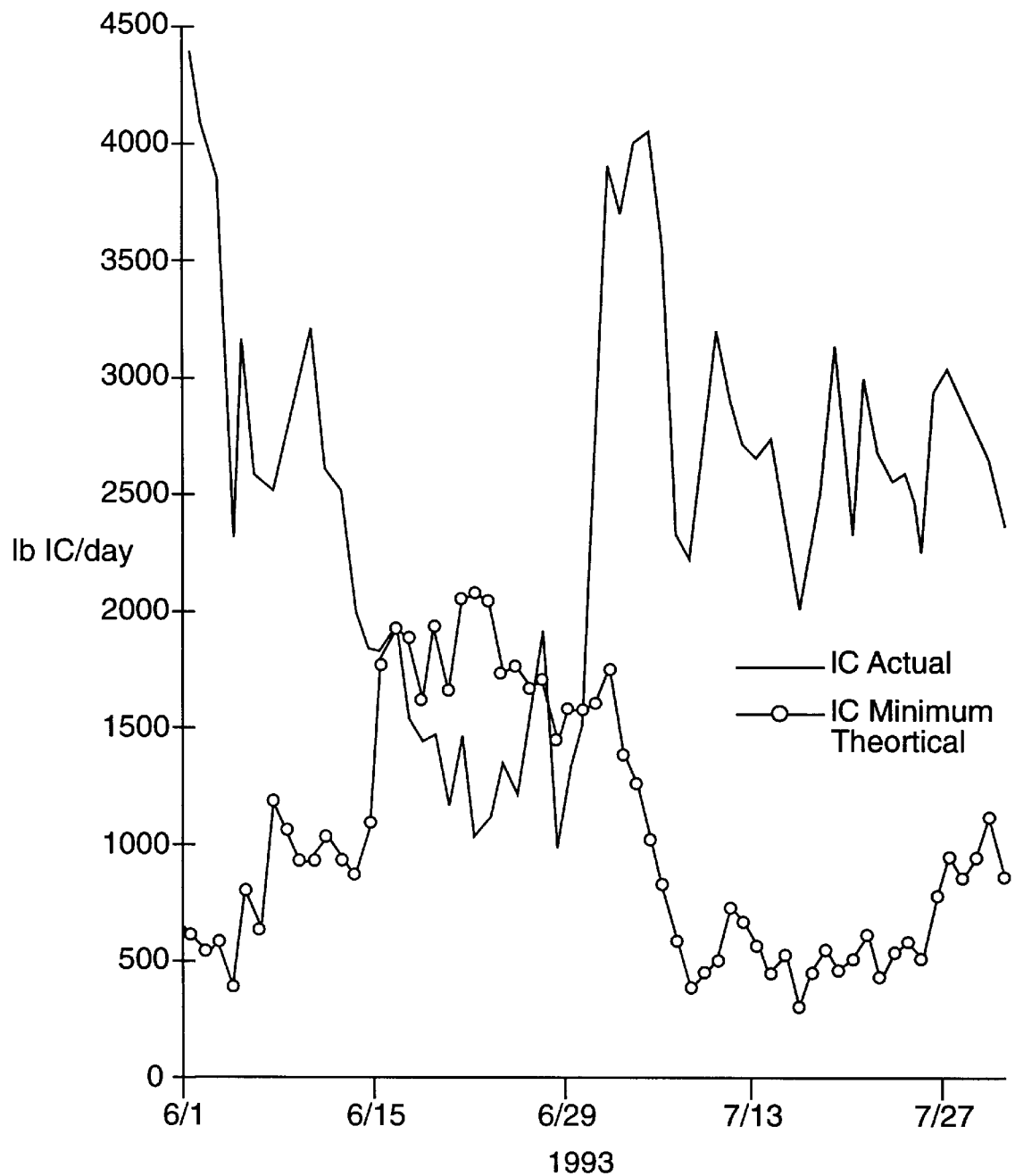

FIGS. 2, 3, and 4 illustrate the utility of the present invention.

FIG. 2 shows the effect of lowering the pH on reactor ammonia-nitrogen concentrations in an upset that occurred in the month of June in 1993. Nitrification was reestablished in a period of 6 days after the pH was held consistently at or below 7.1. Once nitrification was regained, the ammonia-nitrogen concentration in the reactor dropped to less than 1 mg/L, and at that time, pH control ranges were adjusted to 7.4–7.8. This procedure of lowering the pH during an upset in nitrification will work in cases in which the concentration of ammonia-nitrogen is less than the apex of the Area of Complete Nitrification (FIG. 1). If the concentration is higher, some flushing of the system will be required. However, time is gained by not having to wait until the ammonia-nitrogen concentrations are low enough to fall within the triangle at a given value of pH.

FIG. 3 shows how during the month of June in 1993, a sudden drop in feed IC led to nitrification failure. The reactor ammonia-nitrogen concentrations increased from a normal of less than 1 mg/L to a peak of 90 mg/L. FIG. 4 compares the actual amount of IC entering the system to a calculated minimum theoretical IC required. During the upset, a deficit in IC is shown by the two curves crossing each other on the graph. If the actual amount of IC feeding the reactors is less than the minimum theoretically required, provisions have to be made to supplement. During the nitrification upset, an IC source in the form of sodium bicarbonate was injected into the system. The system was stabilized once the concentration of feed IC was brought to over 2000 pounds per day.

What is claimed is:

1. A method to recover from nitrification upsets comprising modifying bioreactor pH by addition of an acid source and addition of an inorganic carbon (IC) source.

2. A method according to claim 1, wherein the IC source is sodium carbonate, sodium bicarbonate and $CO_2$ generated in situ.

3. A method according to claim 1, wherein the acid source is $H_2SO_4$ and HCI.

* * * * *